Figure 1:
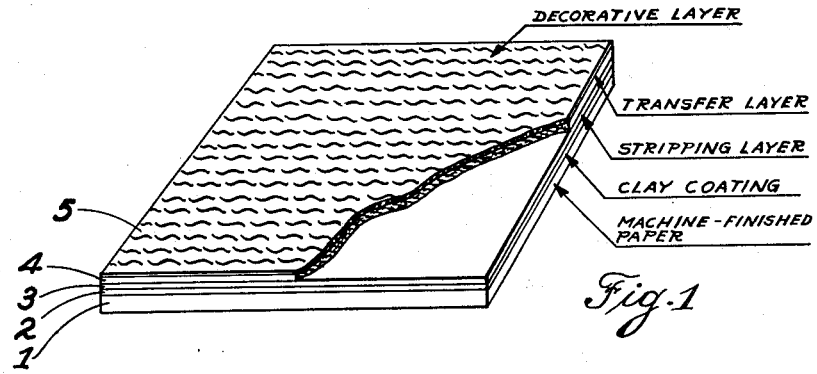

May 19, 1953     T. S. REESE     2,639,253

MELAMINE TRANSFER

Filed April 28, 1951

INVENTOR.
THOMAS S. REESE

BY
Bosworth & Sessions
ATTORNEYS

Patented May 19, 1953

2,639,253

UNITED STATES PATENT OFFICE 2,639,253

MELAMINE TRANSFER

Thomas S. Reese, University Heights, Ohio, assignor to The Di-Noc Company, Cleveland, Ohio, a corporation of Ohio Application April 28, 1951, Serial No. 223,570

16 Claims. (Cl. 154—95)

This invention relates to a process and the product of the process of making a hard-surfaced laminate, preferably, but not necessarily, by means of a decorative transfer applied to a base material.

Hard-surfaced laminates are widely used, particularly for trays, table tops, counters, cabinets, walls, etc. In general, they are made by the application to a base material of a plurality of relatively expensive resin-impregnated carrier sheets some or all of which are decorated or dyed to impart the desired design or color to the final product. Because of limitations inherent in the process; for example, inability of the relatively soft carrier sheets to take and hold the design, laminates so built up are characteristically somewhat fuzzy in appearance. Nevertheless, their excellent resistance to abrasion, their inertness to solvents, reagents and cleaning compounds, and their desirable aging properties have resulted in widespread use of such hard-surfaced laminates notwithstanding the lack of clarity of design.

The present invention has for one of its objects to provide a process for making hard-surfaced laminates of this kind without using resin-impregnated carrier sheets that have to be decorated or dyed to impart the design or color to the product. In lieu thereof, the invention contemplates the use of a plurality of layers of resinous film-forming materials, one of them a decorative layer, that can be laid down or applied without using carrier sheets within the laminate itself, thus saving some of the cost attributable to the use of the carrier sheets. According to the invention, the several layers of resinous film-forming materials are caused to bond together to form a pressure-consolidated composite that intervenes between and is itself bonded both to the base material and to the surfacing layer of the laminate.

The invention has for another of its objects to eliminate the fuzziness of design which, as a result of the use of soft carrier sheets interiorly thereof, characterizes most hard-surfaced laminates of the kind heretofore known. To that end, it contemplates the use in a preferred embodiment of the invention of a dry-stripping decorative transfer which, by contrast with other decorative transfers and by virtue of the materials which go to make it up, is very largely free from sensitivity to humidity, from dimensional instability and from the common tendency of such transfers to curl. It makes use of decorative dry-stripping transfers of a kind described and claimed in copending application Serial No. 206,628, filed January 18, 1951, now Patent 2,606,853, for "Dry Strip Transfer" in the names of Thomas S. Reese and David Galloway, characterized by two more or less incompatible resinous layers, one laid down on the other, between which the separation is effected when the stripping operation is performed. Such transfers have superior design characteristics.

Figure 2:
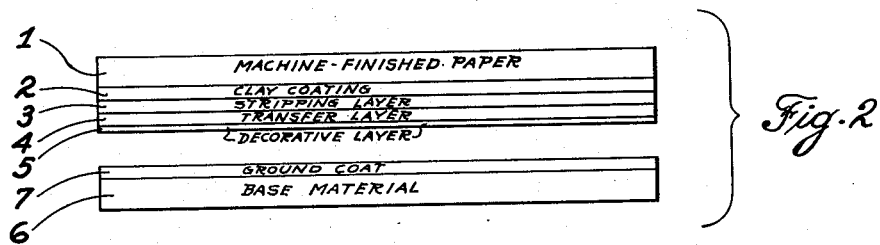
Figure 3:
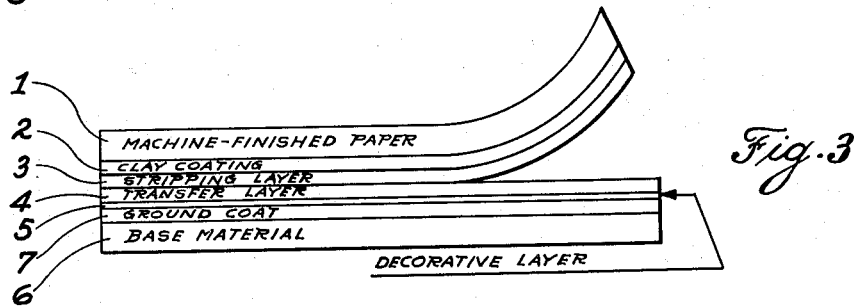
Figure 4:
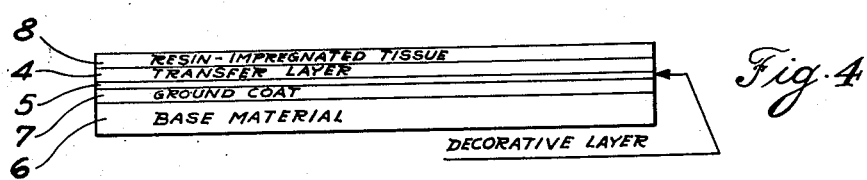

Other objects and advantages of the invention will be apparent from the following description and from the accompanying sheet of drawings, in which Figure 1 shows in diagrammatic fashion a transfer made up in accordance with the present invention; Figure 2 shows in schematic fashion how the transfer is applied to a base material; Figure 3 shows in like schematic fashion the manner in which the temporary carrier is detached, the same being intended to illustrate the operation of dry-stripping; and Figure 4 shows, likewise in schematic fashion, the laminate as it is constituted before it is subject to conditions of temperature and pressure conducive to curing of its resinous components.

Like the decorative dry-stripping transfers described in the copending application, those employed in the practice of the present invention make use of a machine-finished paper as a temporary carrier. Well adapted to the needs of the invention is a sized machine-finished paper, usually made by one of the ordinary mechanical or chemical pulping processes, containing a small amount of a conventional size of casein, rosin or the like that is added to the pulp to give to the paper the strength and dimensional stability desired under varying conditions of humidity. Preferred for the purposes of the invention is a smooth-surfaced calendered paper having a stretch of about 1% as measured by a Mullin tester, a breaking strength of about 20 lbs. per square inch, and a thickness of about 0.004 inch. Preferably, but not necessarily, such paper is finish-coated on one or both sides with a finely-divided pigment such as kaolin (china clay), whiting or the like.

Papers so finished are available on the market and, as a rule, it is therefore not necessary for the manufacturer of the transfer to apply a finishing coat to the paper; indeed, if it is not present, he may, if desired, do without it.

To paper of this kind, with or without a finishing coat, what may be called a stripping layer is applied by calendering, knife-spreading, roll-coating, reverse roll-coating, brushing or spraying so as to provide or form a thin coat, preferably from about 0.0005 to about 0.0010 inch in thickness when dry, of a resinous film-forming material taking the form of a vinyl halide polymer. The latter preferably consists of a polymer of vinyl chloride or a co-polymer of vinyl chloride and vinyl acetate. The film-forming composition may be applied in the form of a calendered sheet, in the form of a stiff emulsion, or in the form of free-flowing suspension or solution.

An organosol is an example of a film-forming composition that may be used. It may consist of a resin, a plasticizer and one or more solvents, which in a typical case may be present in these proportions: as resin, polymerized vinyl chloride (solids), 65%; as plasticizer, a dioctyl phthalate, 52% of resin content; as solvents, methyl ethyl ketone or the like diluted with toluol, xylol or a petroleum fraction, 35% of resin content. Before application, which may be at room temperatures, the organosol has a fusion temperature of about 350° F. (3 minutes). Compositions of this general type are made and sold by various manufacturers. Among the available organosols are Ultrasol L-6763 and Ultrasol L-6848, made by Monsanto Chemical Co. (Plastics Division). The former, which has a viscosity of 2600 centipoises, is preferred for the purposes of the invention.

Another example of a coating composition suitable for these purposes makes use of the copolymer of vinyl chloride and vinyl acetate made by Bakelite Corporation and sold under the trademark Vinyl Resin VYHH. The latter, which takes the form of a white powder, consists by weight of about 87% vinyl chloride and about 13% of vinyl acetate. In formulating the coating composition, 62 pounds of the powder are mixed with 94.5 pounds of acetone, 63 pounds of methyl isobutyl ketone and 157.5 pounds of toluol to yield approximately 51 gallons of a composition which has a solids content of 16.6% by weight. It has a viscosity by the Ford cup method of 23 seconds at 72° F. and can be applied at ordinary room temperatures.

Still a third example involves calendering or otherwise laminating a film of a vinyl chloride polymer or copolymer having a thickness of about 0.0005 inch to paper of the desired characteristics; e. g., uncoated machine-finished paper, to provide a stripping layer on one side thereof.

After the stripping layer has hardened, by which time it should have become so tenaciously attached to the paper or to the finishing coat on the paper that for practical purposes it is inseparable from it, the next step is to lay down on the stripping layer a colored or uncolored layer of resinous film-forming material of such nature that the layer is largely incompatible with the previously applied stripping layer. The incompatibility may be varied as desired within rather broad limits but should not extend so far that the second layer of film-forming material will not adhere satisfactorily to the first layer; rather, there should be enough adherence to permit the transfer as a whole to be handled as a unit but not so much as to preclude easy separation and removal of the paper and the associated stripping layer. The second layer, by contrast with the first, is separable from the paper and constitutes the transfer layer.

The thickness of the transfer layer must be sufficient to cover the stripping layer adequately and may vary between about 0.0003 and about 0.0010 inch after elimination of the solvents.

By way of example of a coating composition that may be applied at ordinary room temperatures to form the transfer layer, one may knife-spread, brush, spray or roll-coat onto the stripping layer a lacquer such as the following:

| Ingredients: | Parts by weight |
|---|---|
| Polyvinyl butyral[1] | 15.000 |
| Melamine resin[2] | 3.000 |
| Ethanol | 90.000 |
| Butanol | 20.000 |
| Toluol | 52.000 |
| Ethyl acid phosphate | .125 |

[1] The polyvinyl butyral should be of the high viscosity-high hydroxyl type.
[2] The melamine resin should be of the butylated melamine-formaldehyde type.

The ethyl acid phosphate is employed to catalyze linkage of the polyvinyl butyral and the melamine resin.

In lieu of the melamine-formaldehyde resin may be used other melamine resins such as melamine-butyraldehyde, melamine-crotonaldehyde, and melamine-propylaldehyde. Because of the use of the melamine resin, the composition requires curing at moderately high temperatures, a step which is performed later in the process as hereinafter described. Whether the transfer layer be of one of the described formulations or of some other formulation, it is usually desirable to allow the film so applied to harden before proceeding further. To this end, the coated product may be run through a drying tunnel through which is passed a current of air at an elevated temperature. Thereafter the product may be passed in known fashion over drums to cool and wind it.

Once the transfer layer has been freed of volatile solvents and the residue has hardened, it is possible to imprint on it to form a decorative layer. By imprinting, reference is had to the production of a continuous or discontinuous design, as by means of an appropriate plate or roller, with or without the use of ink. The decorative feature that is to form part of the transfer as a whole is usually formed in or on the transfer layer, using a medium compatible with the materials of which the transfer layer is formed; however, it may in some cases be formed in or on the stripping layer in such manner that it will adhere to the transfer layer when the transfer layer is separated from the stripping layer.

Where compositions of the type hereinabove described are employed for forming the transfer layer, a nitrocellulose ink may be used for printing. Such an ink may have the following formulation:

| Ingredients: | Parts by weight |
|---|---|
| Carbon black | 3.00 |
| Nitrocellulose, 30 to 35 centipoises | 10.00 |
| Dibutyl phthalate | 4.00 |
| Ethyl acetate | 3.75 |
| Butyl acetate | 9.50 |
| Butyl alcohol | 3.75 |
| Toluol | 21.00 |

(NOTE.—The above ingredients are ground together in a ball mill.)

If, as is contemplated, the ink is to be employed at a temperature of about 72° F., a very thin film, not more than .0001 inch in thickness, should be applied to the transfer layer.

Although factory practice does not always require it, a colored or uncolored ("clear") protective coating of any suitable type, such as a nitrocellulose lacquer, may be applied to the exposed face of the transfer, this in order to obviate damage to the decorative layer during storage.

In practice, the transfer as a whole is then applied to a base which has been prepared by spraying on it or otherwise applying to it a clear or colored preliminary coat, hereinafter referred to as a ground coat, that is similar to or at least compatible with the material of the surface layer of the transfer. The ground coat may advantageously incorporate the colorant, if any, used to impart the desired color to the final product; however, if the transfer itself carries the colorant, the ground coat will ordinarily be uncolored. The type of ground coat that is preferred for these purposes is a tacky composition incorporating a plurality of resinous film-forming materials one of which is a melamine resin and another of which is an alkyd resin. The following formulation is an example of a tacky ground coat suitable for use on hard board:

| Ingredients: | Parts by weight |
|---|---|
| Titanium dioxide OR 340 | 13.50 |
| Aluminum silicate | 3.50 |
| Melamine resin[1] | 2.00 |
| Alkyd resin[2] | 12.00 |
| Toluol | 4.00 |
| Heavy solvent naphtha | 11.00 |
| Butanol | 1.50 |
| Butyl Carbitol (diethylene glycol monobutyl ether) | .75 |

[1] The melamine resin should be of the butylated-melamine formaldehyde type.
[2] The alkyd resin should be of the dehydrated castor oil-pentaerythritol type of very short oil length, such as General Electric Company's #2520 Resin.

A ground coat of this composition may be applied at room temperatures.

The base material is preferably a rigid or relatively rigid material of any one of the wide variety of substances available for this purpose, including metal, glass, wood, hard board, paper board, or the like.

Without waiting for the solvents in the ground coat to be eliminated by evaporation at ordinary temperatures, the transfer is applied intact to the base material. The side of the transfer incorporating the decorative layer is applied to the tacky ground coat. Pressure is applied to consolidate the whole, such pressure being of the order of magnitude of about 500 pounds per square inch. Notwithstanding the consolidation so effected, the bond between the inseparable stripping layer applied to the paper and the separable transfer layer remains a relatively weak bond permitting ready removal of the temporary carrier and the associated stripping layer. The temporary carrier, together with the stripping layer, may therefore be removed by dry-stripping, usually by means of a relatively light force applied by the fingers to one corner of the temporary carrier or with the aid of machinery designed for the purpose.

Thereafter, a resin-impregnated tissue is applied to the stripped transfer, such being superimposed on the exposed transfer layer. The tissue is of the type conventionally employed for such purposes. It consists of a thin web of alpha cellulose paper heavily impregnated with an incompletely cured melamine-formaldehyde resin or, in lieu thereof, one of the other melamine resins previously mentioned. When the tissue is impregnated with an incompletely cured melamine-formaldehyde resin, the product takes the form of a white, translucent, somewhat brittle sheet. It is strong enough so that light pressure may be applied to it in the step of locating it on the transfer layer.

The operations so far described are illustrated in Figures 1 to 4 of the accompanying drawings. Figures 1 and 2 show a decorative transfer made up of a relatively thick layer 1 of machine-finished paper, a thin china clay coating 2 applied to one face thereof, a thin stripping layer 3, a transfer layer 4, likewise thin as compared to the layer of paper, and a very thin decorative layer 5, which may or may not be continuous in and of itself but which is ordinarily co-extensive with transfer layer 4. As indicated in Figure 2, the transfer as a whole is applied with the paper side up to a relatively thick base material 6 having thereon a ground coat 7. After the application of consolidating pressure, paper layer 1, together with stripping layer 3 and intervening clay coat 2, is removed by pulling it away from the transfer layer as indicated in Figure 3. The resin-impregnated tissue, designated 8, is then superimposed on transfer layer 4 as shown in Figure 4.

The intermediate product so obtained is subjected to conditions of temperature and pressure conducive to the curing and bonding of the resinous components of ground coat 7, decorative layer 5, transfer layer 4 and the surface layer 8 of resin-impregnated paper.

To that end, the laminate is subjected to pressure applied by platens, rolls or the like in an environment in which the laminate will attain an elevated temperature that will expedite curing and bonding. Temperatures of from about 300° to about 350° F. and pressures of from about 250 to about 1200 pounds per square inch are ordinarily utilized to this end. In the course of the operation, chemical reactions producing new products take place between the melamine resin forming part of several layers superimposed on base material 6 and one or more of the other resinous constituents, particularly the polyvinyl acetal of transfer layer 4. The reaction products bond tenaciously to each other and to the excess melamine resin present in the incompletely formed laminate. In consequence of curing and bonding under such conditions, the surface layer 8 of resin-impregnated paper becomes transparent and to that extent disappears as a factor affecting the optical appearance of the final product.

The product so obtained is a hard-surfaced laminate highly resistant to abrasion, inert to the action of water, alcohol, cleaning compounds and other substances likely to come into contact with it, and characterized by a high degree of clarity of design.

It is not necessary in or to the practice of the invention that dry strip transfers of the type described above in connection with the preferred embodiments of the invention be employed in the process. It is possible, although in some respects less desirable, to make use of a transfer in which layer-separation is effected by soaking with water and then removing the paper or other temporary carrier, which in such case may be attached to the transfer layer by a stripping layer of dextrin. It is also possible to apply the design to the base material by direct printing by means of a rubber roll or the like, using for the purpose a resinous medium containing a melamine-formaldehyde or other melamine resin onto which, when hardened, can be sprayed a layer of a resinous film-forming composition similar to that employed in forming transfer layer 4. If this is done, a resin-impregnated layer of paper, preferably one impregnated with a melamine-formaldehyde resin, can be applied as before and the whole subjected to the conditions of temperature and pressure necessary or desirable to cure and bond the resinous constituents.

It is obvious that the foregoing disclosure is by way of example only and that numerous changes other than those specifically mentioned may be made within the purview of the invention. In lieu of employing machine-finished paper, it is possible to use a more expensive paper, although machine-finished paper, even if not clay-coated, offers important advantages. The compositions used for the stripping layer, the transfer layer and the ground coat may be varied within wide limits. The base material may take any one of the forms previously mentioned or any one of various other conventional forms which usually, but not necessarily, are relatively thick as compared with the other components of the laminate. Other types of resin-impregnated tissues may be used in place of alpha cellulose paper impregnated with melamine-formaldehyde resin, although the latter is preferred for the purpose because of the clear, hard, inert surface that is produced on the laminate when it is used.

It is intended that the patent shall cover, by summarization in the appended claims, whatever features of patentable novelty reside in the invention.

What is claimed is:

1. A process of making a hard-surfaced laminate comprising the steps of applying to a base material a tacky ground coat containing a resinous material; applying to the tacky ground coat a decorative transfer comprising a decorative layer, a resinous transfer layer, a resinous stripping layer, and a temporary carrier, the side of the transfer incorporating the decorative layer being imposed on the tacky ground coat on the base material; stripping from the transfer the temporary carrier and the associated stripping layer; superimposing a resin-impregnated tissue on the exposed transfer layer of the stripped transfer; and, to the end of consolidating the laminate, subjecting it to temperature and pressure conditions conducive to curing and bonding of the resinous components of the tacky ground coat on the base material, the transfer layer and the resin-impregnated tissue.

2. A process as in claim 1 in which the layer of resinous material in the tacky ground coat applied to the base material comprises a melamine resin.

3. A process as in claim 1 in which the layer of resinous material in the tacky ground coat applied to the base material comprises a melamine-formaldehyde resin.

4. A process as in claim 1 in which the layer of resinous material in the tacky ground coat applied to the base material comprises a plurality of resins one of which is a melamine resin and one of which is an alkyd resin.

5. A process of making a hard-surfaced laminate comprising the steps of applying to a base material a layer of resinous material; applying to the resinous layer so laid down on the base material a decorative transfer comprising a decorative layer, a resinous transfer layer, a resinous stripping layer, and a temporary carrier, the side of the transfer incorporating the decorative layer being imposed on the resinous layer on the base material; stripping from the transfer the temporary carrier and the associated stripping layer; superimposing a resin-impregnated tissue on the exposed transfer layer of the stripped transfer; and, to the end of consolidating the laminate, subjecting it to temperature and pressure conditions conducive to curing and bonding of the resinous components of the resinous layer on the base material, the resinous transfer layer, and the resin-impregnated tissue.

6. A process as in claim 5 in which the transfer layer comprises a melamine resin.

7. A process as in claim 5 in which the transfer layer comprises a melamine resin and a polyvinyl butyral resin.

8. A process as in claim 5 in which the transfer layer comprises a melamine-formaldehyde resin, a polyvinyl butyral resin and a catalyst.

9. A process as in claim 5 in which the resin-impregnated tissue is impregnated with a melamine-formaldehyde resin.

10. A process of making a hard-surfaced laminate comprising the steps of applying to a base material a tacky ground coat; applying to the tacky ground coat a decorative transfer comprising a decorative layer, a transfer layer, a stripping layer, and a temporary carrier, the side of the transfer incorporating the decorative layer being imposed on the tacky ground coat on the base material; stripping from the transfer the temporary carrier and the associated stripping layer; superimposing a resin-impregnated tissue on the exposed transfer layer of the stripped transfer; and, to the end of consolidating the laminate, subjecting it to temperature and pressure conditions conducive to bonding of the tacky ground coat on the base material, the transfer layer and the resin-impregnated tissue.

11. A transfer comprising a temporary carrier; a stripping layer inseparably attached to the temporary carrier, said stripping layer comprising a resinous film-forming material; a separable transfer layer of resinous film-forming material laid down on the stripping layer, said transfer layer incorporating a melamine resin; and, imprinted on the transfer layer, a decorative layer comprising a resinous film-forming material.

12. An article of manufacture comprising a base material; a transparent tissue impregnated with a cured melamine-formaldehyde resin; and, intervening between and bonded to both of them, a pressure-consolidated composite made up of a resinous layer in contact with the base material, a nitrocellulose decorative layer, and, in contact with the transparent tissue, a resinuous layer containing a cured melamine-formaldehyde resin.

13. An article of manufacture comprising a base material; a transparent tissue impregnated with a cured melamine resin; and, intervening between and bonded to both of them, a pressure-consolidated composite made up of a plurality of resinous layers one of which is a nitrocellulose decorative layer, each of the other layers making up such pressure-consolidated composite containing a cured melamine resin.

14. A process of making a hard-surfaced laminate comprising the steps of applying to a base material a layer of resinous material; applying a resinous decorative layer to the resinous material so applied to the base material, said resinous decorative layer containing nitrocellulose; superimposing on the resinous decorative layer a tissue impregnated with a melamine resin; and, to the end of consolidating the laminate, subjecting it to temperature and pressure conditions conducive to curing and bonding of the resinous components of the resinous layer on the base material, the resinous decorative layer and the resin-impregnated tissue.

15. A process as in claim 14 in which the resin-impregnated tissue is impregnated with a melamine-formaldehyde resin.

16. A process as in claim 15 in which the layer of resinous material applied to the base material includes a melamine-formaldehyde resin.

THOMAS S. REESE.

References Cited in the file of this patent

UNITED STATES PATENTS

| Number | Name | Date |
|---|---|---|
| 1,454,845 | Clay | May 15, 1923 |
| 1,591,304 | Giveans | July 6, 1926 |
| 1,597,539 | Novotny et al. | Aug. 24, 1926 |
| 1,899,066 | Tonge | Feb. 28, 1933 |
| 1,966,942 | Atkinson | July 17, 1934 |
| 2,084,081 | Faber | June 15, 1937 |
| 2,197,357 | Widmer et al. | Apr. 16, 1940 |

FOREIGN PATENTS

| Number | Country | Date |
|---|---|---|
| 480,316 | Great Britain | 1938 |

OTHER REFERENCES

Chemistry and Industry, Amino Resins, Dec. 2, 1944, pp. 410–412.